Nov. 12, 1968     W. SCHNEIDER     3,409,954
TUBE HOLDER
Filed May 24, 1967
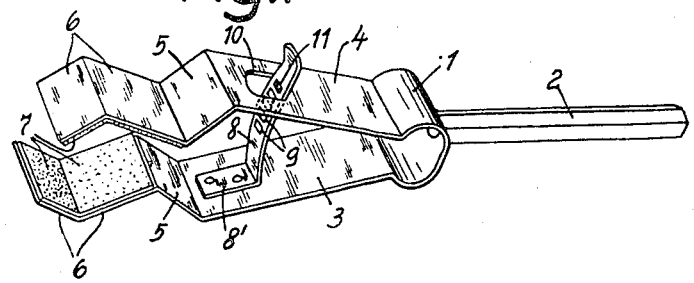
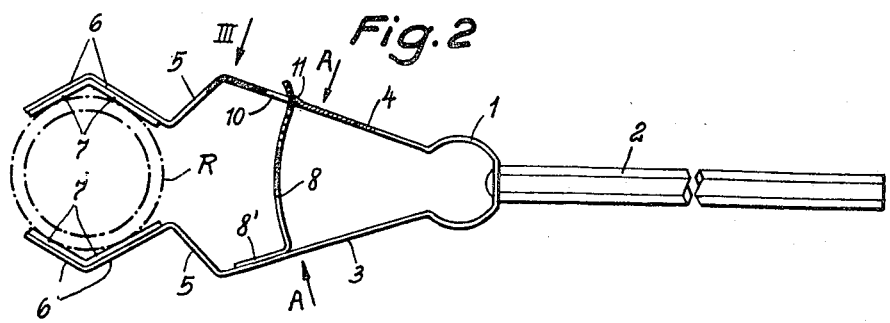
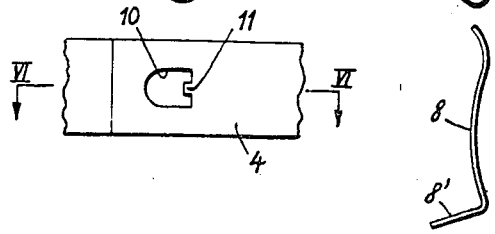
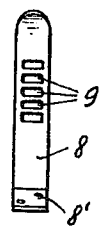
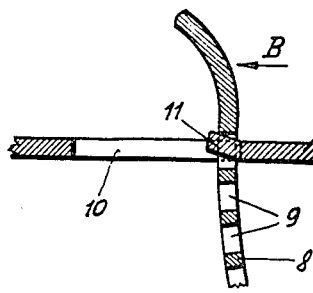
WALTER SCHNEIDER
INVENTOR.
BY Karl G. Ross
Attorney

United States Patent Office 3,409,954
Patented Nov. 12, 1968

3,409,954
TUBE HOLDER
Walter Schneider, Unterrenggstrasse 8135,
Langnau am Albis, Switzerland
Filed May 24, 1967, Ser. No. 641,011
Claims priority, application Switzerland, July 8, 1966,
10,006/66
4 Claims. (Cl. 24—257)

ABSTRACT OF THE DISCLOSURE

A tube holder fashioned from a bent leaf spring has a first leg formed with a cutout and a second leg provided with a bent spring tongue traversing the cutout for locking engagement with a lug extending from an edge of that cutout, the tongue having a plurality of notches adapted to receive this lug.

This invention relates to a tube holder, for use particularly in chemical laboratories, which is distinguished by its remarkable ease of handling when a tube is clamped or released. A further advantage is its resilient clamping action which precludes the breakage of laboratory utensils of glass when they are being clamped in the holder.

The tube holder according to the invention is provided for this purpose with a clamp formed by two spring legs which can be moved towards each other. One of these clamp legs carries a resilient locking tongue whose locking notches interact with a projection on the other clamp leg and permit the locking of the legs in the desired clamping position.

The accompanying drawing shows by way of example a preferred embodiment of the invention.

In the drawing:

FIG. 1 is a perspective view of the tube holder with the clamp legs locked in the widest clamping position;

FIG. 2 is a side elevation, partly in section, of the tube holder immediately before locking of the clamp legs which are engaging a tube to be held;

FIG. 3 is a partial view of a clamp leg carrying a projection, as seen in the direction of the arrow III in FIG. 2;

FIG. 4 is a side elevation of a locking tongue;

FIG. 5 is a top view thereof, and

FIG. 6 is a longitudinal section through the clamp leg carrying the projection as taken on the line VI—VI of FIG. 3, showing its interaction with the locking tongue, on a larger scale.

As shown in the drawing, the tube holder has a clamp 1 made from a leaf spring, with clamp legs 3 and 4 bent symmetrically with respect to a stem 2 attached to the clamp at the vertex of these legs. The free ends of clamp legs 3 and 4, which generally diverge in the direction away from the vertex, form angled gripper jaws 6 beyond two confronting inbent sections 5, the jaws being lined on their inner faces with a soft covering 7 giving good gripping properties. On the inside of one clamp leg 3 a locking tongue 8 formed from a leaf spring is attached by spot welding by means of an angled mounting flange 8'. Locking tongue 8 is longitudinally curved, with its concave side facing the clamp vertex 1, and is provided with several throughgoing locking notches 9. The free end of locking tongue 8, bent away from this vertex, passes through a perforation 10 in clamp leg 4 which lies opposite clamp leg 3 carrying the locking tongue 8. Clamp leg 4 carries, on the transverse edge of perforation 10 nearer the vertex of the clamp legs, a projection 11 which protrudes into the perforation and which, as shown in FIG. 6, is bent outwardly in such a way that when the clamp legs 3 and 4 are pressed together in the direction of arrows A in FIG. 2, thus against the inherent bias of the leaf spring which tends to spread the legs apart, the locking tongue 8, which lies against projection 11 as a result of its spring force, is cammed away in opposition to its spring action by the slanting projection 11 and thus slides over the projection.

The tube holder described above permits quick and effortless manipulation with one hand. When the tube is held in one hand, pressure of the thumb on the free end of locking tongue 8 in the direction of arrow B (FIG. 6) puts the locking mechanism out of action and releases the clamp legs 3 and 4. With the clamp in this unstressed position, the tube R to be clamped (FIG. 2) is placed between gripper jaws 6 and 7 of clamp legs 3 and 4. Clamp legs 3 and 4 are now pressed together in the direction of arrows A by the hand holding the clamp until tube R is under the desired clamping pressure. Upon release of the pressure exerted by the hand on the clamp legs, projection 11 automatically enters the next notch 9 as a result of the spring force exerted by locking tongue 8 in the direction toward the vertex, i.e. opposite arrow B. This is so because the outward inclination of lug 11 (as seen from the bisector of clamp 1) with reference to the plane of cutout 10 enables the aforedescribed camming action to continue until the relative motion of leg 4 and tongue 8 is arrested or reversed. Thereafter, the tongue snaps back and lets the lug 11 completely penetrate the throughgoing slot or notch 9 aligned with it at this point. The interengagement of this lug and a desired notch is facilitated by the presence of the elbows 5 between the tongue 8 and the tube-gripping extremities 6 of the clamp.

What I claim is:

1. A tube holder comprising two clamp legs with tube-gripping extremities biased into a spread-apart position, one of said legs being provided with a cutout; a projection on a transverse edge of said cutout inclined with reference to the plane of said cutout in a direction away from the other leg; and a resilient lockiing tongue mounted on said other leg and projecting through said cutout, said tongue having a plurality of notches longitudinally spaced thereon and engageable by said projection, said tongue being provided beyond said notches with a free end bent away from said edge for camming displacement by said projection, upon movement of said legs toward each other, against a biasing force urging said tongue toward said edge.

2. A tube holder as defined in claims 1 wherein said legs form part of a bent leaf spring having a vertex from which said legs diverge, said tongue being biased toward said vertex and being longitudinally curved with a concavity facing said vertex.

3. A tube holder as defined in claim 2 werein said legs are bent into confronting elbows between said tongue and said extremities.

4. A tube holder as defined in claim 1 wherein said notches are throughgoing slots, said projection being long enough to pass completely through any of said slots upon engaging same.

References Cited

UNITED STATES PATENTS

| 358,928 | 3/1887 | Hart | 81—43 XR |
|---|---|---|---|
| 363,396 | 5/1887 | King | 24—66 |
| 832,317 | 10/1906 | Hinds | 81—43 |
| 1,283,446 | 11/1918 | Anderson | 248—226.3 XR |
| 1,707,754 | 4/1929 | Bone. | |
| 2,081,797 | 5/1937 | Di Figlia | 248—226.3 XR |
| 2,608,433 | 8/1952 | Marbeuf. | |
| 2,977,145 | 3/1961 | Rifkin. | |
| 3,122,802 | 3/1964 | Kaufman | 24—66 |

DONALD A. GRIFFIN, Primary Examiner.